United States Patent Office 3,428,497
Patented Feb. 18, 1969

3,428,497
METHOD OF MAKING BONDED WELDING FLUX
Thomas L. Coless, Maplewood, N.J., assignor to Union Carbide Corporation, a corporation of New York
No Drawing. Filed Apr. 26, 1966, Ser. No. 545,301
U.S. Cl. 148—26      6 Claims
Int. Cl. C23c 1/12

This invention relates to welding flux compositions and, more particularly, to a method for making such compositions.

Welding compositions are made up of many well-known ingredients which are either fused or bonded together to produce the desired end product. These end products or welding flux compositions are particularly useful in submerged arc welding wherein an arc is maintained between a consumable metallic electrode and the work, the arc and the deposited weld metal being protected from the atmosphere by a layer of welding composition placed on the work to a depth sufficient to submerge the arc as the latter is caused to traverse the seam to be welded.

This invention relates to bonded welding compositions which are distinguished from the fused compositions by the fact that the ingredients are finely ground materials cemented together with a bonding agent, usually sodium or potassium silicate containing a sufficient amount of water to be liquid, as opposed to fusing the ingredients together by melting.

Generally bonded welding compositions are made by dry mixing the ingredients in a blender and then adding an aqueous solution of a metal silicate, preferably sodium or potassium silicate. The bonded ingredients are formed into granules, agglomerates, or pellets of the composition. The materials are heated to remove moisture and gaseous products, then screened to a desired mesh size. However, it was found that when the flux ingredients were mixed in batches with an aqueous solution of a binder, the material became impossible to handle because the aqueous binder caused the ingredients to become wet and sticky. The wet ingredients which were in pellet or agglomerate form would compact together into a semisolid mass before they could be further processed.

Therefore, it is an object of this invention to provide a method for making bonded welding compositions in a batch process wherein handling of the bonded ingredients is facilitated.

The objects of the invention are achieved by introducing carbon dioxide through the wet pellets or agglomerates of ingredients to eliminate the wet and sticky surface conditions, thus permitting the material to flow easily.

It has been found that the carbon dioxide reacts with the metal oxide in the aqueous binder to convert such oxide to a hydrated carbonate which is not sticky and which does not have free water. This reaction is described by the following chemical equation wherein M represents the metal in the oxide:

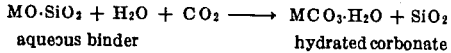

$$MO \cdot SiO_2 + H_2O + CO_2 \longrightarrow MCO_3 \cdot H_2O + SiO_2$$
aqueous binder          hydrated carbonate The invention will now be described by referring to the following preferred embodiment. It is to be understood that reference to particular ingredients in particular amounts is merely for illustrating purposes and in no way is intended to limit the invention unless otherwise expressly so stated.

Five hundred pounds (500 lbs.) of pulverized ingredients, including various oxides and metal deoxidizers, were placed in a blender. The ingredients were dry-blended for about five (5) minutes or until the mixture became substantially homogeneous. Sodium silicate solution was added to the dry mix at the rate of approximately 10 lbs./min. until about fifty (50) lbs. were added. The wet ingredients were then granulated. In this embodiment, granules were formed in the blending apparatus. The blending apparatus is preferably a rolling or tumbling-type blender. When the desired degree of granulation has been achieved, carbon dioxide gas is introduced into the wet granulated ingredients while the ingredients are continuously rolled or tumble in thde blender so that the carbon dioxide can come into contact with the individual granules. Carbon dioxide gas should be added until the granules become surface dried. In this example, carbon dioxide gas was passed through the blender to subject the ingredients to a carbon dioxide atmosphere. The carbon dioxide gas was introduced at 20 cu. ft./min. for two (2) minutes. At the end of the carbon dioxide treatment the granules were dry to the touch.

Usually a treatment with carbon dioxide gas for from about one (1) to two (2) minutes is sufficient to achieve the degree of dryness necessary. It is obvious, however, that the length of treatment will depend on the size of the blending apparatus, the amount of ingredients in the batch, and the rate of carbon oxide introduction. The important criteria is that the carbon dioxide treatment be continued just until the granules become surface dry and lose their tendency to adhere to each other. Excessive amounts of carbon dioxide will convert the silicate in the binder to excessive amounts of a carbonate which is no longer a binder and, thus, will cause the granules to disintegrate. When the granules become surface dried, they are fed to a drum screener to presize the composition. From the drum screener the ingredients are fed to the drying kiln where the ingredients are heated to a temperature of from about 700 degs. C. to about 1100 degs. C. to remove all the water and to break down carbonates to drive off the carbon dioxide gas. The heating operation additionally removes any other gaseous products which would be formed in the heat of the arc.

In addition to the previously mentioned advantages of making flux according to this invention, it has been found that carbon dioxide treatments permit greater retention of metal deoxidizers which are usually found in bonded fluxes. Normally the metal oxide in an aqueous solution forms a caustic solution. This caustic solution is highly reactive with metallic deoxidizers such as silicon, aluminum, ferromanganese silicon, etc. The reaction between carbon dioxide and metal oxide reduces the amount of caustic solution which can form, thus reducing the reaction between the caustic and the metal deoxidizers.

This advantage will be more clearly understood by reference to the following equation, wherein sodium is the metal in the oxide:

(1) $$Na_2O \cdot SiO_2 + H_2O \longrightarrow 2NaOH + SiO_2$$
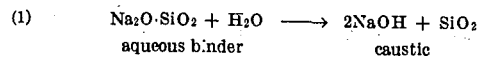
aqueous binder          caustic If the caustic is permitted to form it will attack the deoxidizer as follows:

(2) $$2NaOH + H_2O + Si \longrightarrow Na_2SiO_3 + 2H_2$$
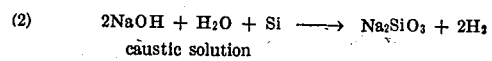
caustic solution The carbon dioxide reaction, however, converts the binder to a carbonate instantaneously, thus preventing reaction (1) from occurring and retaining to a greater amount the deoxidizers in the flux.

While the invention has been described with reference to a certain preferred embodiment, it is clear that modifications in procedures may be made without departing from the concept of the invention.

What is claimed is:
1. Method for making a bonded welding composition which comprises: introducing carbon dioxide into a batch of wet welding composition ingredients containing a metal oxide bonding agent to react said carbon dioxide with said metal oxide.

2. A method for making a welding composition which comprises:
(a) dry mixing ingredients to be made into a welding composition;
(b) adding an aqueous solution of a bonding agent to the dry mixed ingredients;
(c) passing said ingredients through a granulating device to form wet, bonded granules of the welding composition;
(d) introducing carbon dioxide into the wet ingredients to cause said granules to become free-flowing; and
(e) heating said granules to thoroughly dry the same.

3. Method according to claim 2 wherein the carbon dioxide is introduced into gaseous form.

4. Method according to claim 2 wherein the bonding agent is taken from the class of materials consisting of sodium and potassium silicate.

5. Method according to claim 2 wherein the granules are heated at a temperature from about 700 degs. C. to about 1100 degs. C.

6. In the method of making agglomerates from ingredients bonded together with an aqueous solution of a metal oxide bonding agent the improvement which comprises introducing carbon dioxide into such wet bonded ingredients to at least surface dry said agglomerates.

References Cited

UNITED STATES PATENTS

| 2,474,787 | 6/1949 | Landis et al. | 148—26 |
| 2,948,967 | 8/1960 | Myers | 23—63 |

FOREIGN PATENTS

| 157,107 | 4/1951 | Australia. |
| 524,020 | 4/1956 | Canada. |

HYLAND BIZOT, *Primary Examiner.*

T. R. FRYE, *Assistant Examiner.*

U.S. Cl. X.R.

23—63; 106—84; 148—22, 23